3,075,973
3-AMINOALKYLATED-1-(5-NITROFURFURYLI-
DENEAMINO)HYDANTOINS
Julian Getz Michels, Norwich, N.Y., assignor to The
Norwich Pharmacal Company, a corporation of New
York
No Drawing. Filed Dec. 27, 1960, Ser. No. 78,330
5 Claims. (Cl. 260—240)

This invention relates to a new series of chemical compounds which possess a high order of antibacterial activity and which exhibit resistance to metabolic destruction. This series includes a number of closely related nitrofuran compounds and the acid addition salts thereof which may be described as 3-aminoalkylated-1-(5-nitrofurfurylideneamino)hydantoins. They may be represented by the formula:

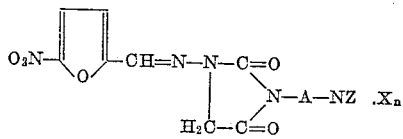

wherein

A represents an alkylene chain containing from 2 to 4, inclusive, carbon atoms;
NZ represents a member of the group consisting of monoalkylamino, dialkylamino and piperidino
X represents an acid; and
$n$ represents a number from 0–1.

These new compounds which I have invented are very effective systemic chemotherapeutic agents when administered per os to animals lethally infected with highly pathogenic bacteria; for instance, *Staphylococcus aureus*. Death is prevented in 60% of mice lethally infected with that organism by the oral administration one-half hour post infection of a single dose of 105 mg./kg. of members of my new series. Mice similarly infected but not treated with a member of my series suffer a mortality of 95%.

My new compounds are not limited to the oral route of administration for chemotherapeutic purposes. The acid addition salts, particularly those formed with physiologically tolerable acids, such as hydrochloric, sulfuric and phosphoric, are readily soluble in aqueous media. These salts because of their solubility may be readily adapted to the parenteral route of administration, for instance, intravenous, by dissolving them in physiologically acceptable menstrua such as isotonic saline or glucose solution.

My new compounds are remarkably resistant to metabolic processes which frequently cause substantial breakdown and loss of available active agent. When they are administered to rats, a surprising amount of the dose, from 12–30%, appears in the urine. This amount renders the urine antibacterial to organisms such as *Escherichia coli* and *S. aureus*, frequently encountered and often troublesome in urinary tract infections. The ability possessed by these compounds to resist metabolic influences and to provide urinary antibacterial concentrations makes them valuable urinary tract chemotherapeutics.

These new compounds are relatively non-toxic. There is, as might be expected, a variation in toxicity from one member to another. In mice the highest tolerated dose ranges from 360–1700 mg./kg.

The compounding and formulating of my 3-aminoalkylated-1-(5-nitrofurfurylideneamino)hydantoins in dosage forms such as tablets, suspensions, elixirs, syrups, lozenges and the like is readily carried out using those excipients and adjuvants commonly employed in pharmaceutical practice which are for convenience and suitability best adapted.

The various members of my new series of compounds differ from each other somewhat in degree of therapeutic activity. A particular member which I now prefer, which has been found in especially high concentration in the urine of animals to which it has been administered and which exhibits extraordnary activity against *E. coli*, is 3 - (3 - isopropylaminopropyl) - 1 - (5-nitrofurfurylideneamino)hydantoin hydrochloride.

The preparation of members of my series can be readily carried out in a number of ways. The method which I currently prefer consists in heating a solution comprising a salt of a 1-alkylidene- or 1-aralkylideneaminohydantoin, an aminoalkylhalide and an organic solvent to produce a 3-aminoalkylated-1-alkylidene- or 1-aralkylideneaminohydantoin, treatment of the product of that reaction to release the 3-aminoalkylated-1-aminohydantoin which is then caused to react with 5-nitrofurfural or a derivative thereof capable of supplying it under the reaction conditions.

More specifically, I have found that a solution of sodium 1-benzylideneaminohydantoin in dimethylformamide reacts readily under the influence of heat with an appropriate aminoalkylchloride to yield the 3-aminoalkylated-1-benzylideneaminohydantoin. Removal of the dimethylformamide followed by steam distillation of the residue in the presence of an aqueous mineral acid, i.e., hydrochloric, to remove the benzaldehyde and to release the 3-amino-alkylate-1-aminohydantoin for reaction with 5-nitro-2-furfuraldehyde produces the 3-aminoalkylated-1 - (5 - nitrofurfurylideneamino)hydantoin in excellent yield. The reactions may be illustrated as follows in which the symbols have the meaning ascribed above:

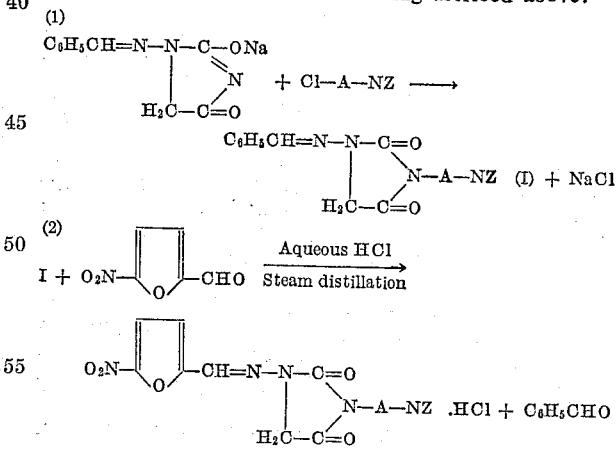

Another feasible method for obtaining my 3-aminoalkylated - 1 - (5-nitrofurfurylideneamino)hydantoins involves interacting a salt of a 1-alkylidene- or 1-aralkylideneaminohydantoin such as sodium 1-benzylideneaminohydantoin with a dihaloalkane such as 1-bromo-4-chlorobutane to produce a 3-haloalkylated-1-alkylidene- or 1-aralkylideneaminohydantoin and then causing said 3-haloalkylated hydantoin to react with the appropriate amine; for instance, piperidine, to form the 3-aminoalkylated-1-alkylidene- or 1-aralkylideneaminohydantoin followed by exchange of the carbonyl fragment of that product for the 5-nitrofurfurylidene group in the presence of an aqueous acidic medium containing 5-nitro-2-furaldehyde or reactive derivative thereof.

A depiction of the reactions taking place in this method and reactants therein is:

(1)

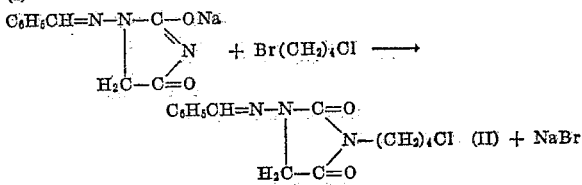

(2)

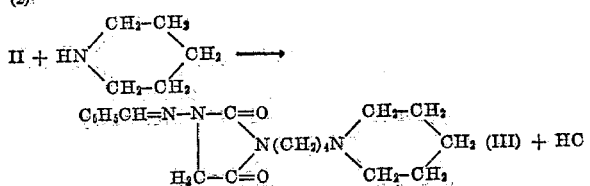

(3)

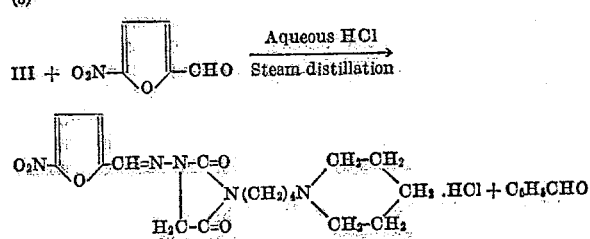

In order that compounds embraced within my invention may be readily appreciated by and fully available to those skilled in the art, the following illustrative but not limitative examples of the preparation thereof are supplied:

EXAMPLE I

*3-(2-Dimethylaminoethyl)-1-(5-Nitrofurfurylidene-amino)hydantoin Hydrochloride*

A solution of 50 g. (0.25 mole) of 1-benzylideneaminohydantoin in 1250 cc. of dimethylformamide is treated with 11 g. of 55% sodium hydride in mineral oil. When the reaction is complete, 26.7 g. (0.25 mole) of freshly distilled 2-dimethylaminoethyl chloride is added and the mixture heated at 110–115° C. overnight. The dimethylformamide is distilled off under reduced pressure and the residue steam distilled in the presence of hydrochloric acid. When no more benzaldehyde is evolved, a solution of 35 g. (0.25 mole) of 5-nitro-2-furaldehyde in alcohol is added. On standing, a small amount of yellow precipitate forms and is removed by filtration. The filtrate is evaporated to dryness under reduced pressure. The yellow residue is boiled with 250 cc. of alcohol while water is added gradually. 100 cc. of water is required for complete solution. After adding charcoal and boiling, the mixture is filtered hot, then cooled to give 58 g. (67.5%) of 3-(2-dimethylaminoethyl) - 1 - (5-nitro-furfurylidene-amino)hydantoin hydrochloride, decomposing gradually above 200° C.

The hydrochloride is converted to the free base by basifying its aqueous solution with sodium bicarbonate. The free base is recovered by filtration.

The free base can be converted to salts such as the sulfate or phosphate by reacting it with the appropriate acid in anhydrous alcohol.

In this example 5-nitro-2-furaldehyde diacetate may be substituted as a source of 5-nitro-2-furaldehyde.

EXAMPLE II

*3-(3-Diethylaminopropyl)-1-(5-Nitrofurfurylidene-amino)hydantoin Hydrochloride*

3 - (3 - diethylaminopropyl) - 1 - (5-nitrofurfurylideneamino)hydantoin hydrochloride is prepared by the same procedure used in Example I using 50 g. (0.25 mole) of benzylideneaminohydantoin, 1250 cc. dimethylformamide, 11 g. sodium hydride, 39 g. (0.26 mole) of freshly distilled diethylaminopropyl chloride (B.P. 51.5–52° C. at 8.5–9 mm.) and 35 g. of 5-nitro-2-furaldehyde. After treating with charcoal and filtering hot, the filtrate is cooled to crystallize the crude product. It is washed with alcohol and ether and dried to give 64 g. (66%) of 3-(3-diethylaminopropyl) - 1 - (5-nitrofurfurylideneamino)hydantoin hydrochloride. Recrystallization is carried out with 500 cc. alcohol and 100 cc. water using charcoal. A 94% recovery of 3-(3-diethylaminopropyl)-1-(5-nitrofurfurylideneamino)hydantoin hydrochloride decomposing at 238–239° C. is obtained.

EXAMPLE III

*3-(3-Dimethylaminopropyl)-1-(5-Nitrofurfurylidene-amino)hydantoin Hydrochloride*

3-(3-dimethylaminopropyl) - 1 - (5-nitrofurfurylideneamino)hydantoin hydrochloride is prepared by the same procedure used in Example I using 17 g. (0.084 mole) of benzylideneaminohydantoin, 425 cc. dimethylformamide, 3.8 g. of sodium hydride, 11 g. (0.09 mole) of dimethylaminopropyl chloride (B.P. 58° C. at 55 mm.) and 10 g. of 5-nitro-2-furaldehyde. The crude produce obtained by evaporation is recrystallized from a mixture of 200 cc. alcohol and 50 cc. water using charcoal. There is obtained 23.7 g. (54%) of 3-(3-dimethylaminopropyl)-1-(5-nitrofurfurylideneamino)hydantoin hydrochloride decomposing at 238–241° C.

EXAMPLE IV

*3-(Diethylaminoethyl)-1-(5-Nitrofurfurylideneamino)-hydantoin Hydrochloride*

3 - (2 - diethylaminoethyl) - 1 - (5 - nitrofurfurylideneamino)hydantoin hydrochloride is prepared by the same procedure used in Example I using 40 g. (0.2 mole) of benzylideneaminohydantoin, 1 liter dimethylformamide, 8.8 g. sodium hydride, 28.3 g. (0.21 mole) of diethylaminoethyl chloride (B.P. 64° C. at 32 mm.) and 28 g. 5-nitro-2-furaldehyde. After treatment with charcoal and filtering hot, the filtrate is cooled to crystallize 49.3 g. of 3-(2 - diethylaminoethyl)-1-(5-nitrofurfurylideneamino)-hydantoin hydrochloride. Evaporation of this filtrate and recrystallization of the residue from alcohol gives a second crop of 3-(2-diethylaminoethyl)-1-(5-nitrofurfurylideneamino)hydantoin hydrochloride. The two crops are combined and recrystallized twice from alcohol-water mixture using charcoal. There is obtained 33 g. (42.5%) of 3 - (2 - diethylaminoethyl) - 1 - (5-nitrofurfurylideneamino)hydantoin hydrochloride decomposing at 227–230° C.

EXAMPLE V

*3-(4-Piperidinobutyl)-1-(5-Nitrofurfurylideneamino)-hydantoin Hydrochloride*

A solution of 50 g. of 1-benzylideneamino-3-(4-chlorobutyl)hydantoin (prepared by reacting sodium 1-benzylideneaminohydantoin with 1-bromo-4-chlorobutane) dissolved in 200 ml. of piperidine is heated on the steam bath for 2 hours and then evaporated to dryness under reduced pressure. The residue is triturated with water, filtered, washed with water and dissolved in 10% HCl. The solution is filtered through celite and boiled until benzaldehyde is no longer evolved. A solution of 24 g. of 5-nitro-2-furaldehyde in methanol is added to the hot solution. The product is crystallized from ethanol to yield 40 g. (56.5%, M.P. 229–223° C. dec.) of 1-(5- nitrofurfurylideneamino) - 3 - (4-piperidinobutyl)hydantoin hydrochloride.

EXAMPLE VI

*3-(2-Diisopropylaminoethyl)-1-(5-Nitrofurfurylideneamino)hydantoin Hydrochloride*

A mixture of 62.5 g. (0.31 mole) of 1-benzylideneaminohydantoin, 13.5 g. (0.31 mole) of a 55% dispersion of sodium hydride in mineral oil and 1300 ml. of dimethylformamide is heated on a steam bath until reaction is complete. The mixture is removed from the steam bath and 50.5 g. (0.31 mole) of diisopropylaminoethyl chloride is added. The mixture is heated in an oil bath at 110–120° C. for 20 hours. The precipitated sodium chloride is filtered (17.1 g., 95% of theoretical) from the hot solution. Upon cooling, the filtrate deposited 78 g. (77%) of crystalline 3-(2-diisopropylaminoethyl)-1-benzylideneaminohydantoin. This is collected and its filtrate is concentrated under reduced pressure to a small volume. Addition of water causes the separation of a further small amount of product (estimated at 10–15 g.). This is combined with the first crop; suspended in 1200 ml. of water; and 30 ml. of hydrochloric acid is added. This mixture is steam-distilled until the evolution of benzaldehyde ceases (ca. 10 hours) with addition of 10 ml. of hydrochloric acid every 3–4 hours. A solution of 43 g. (0.31 mole) of 5-nitro-2-furaldehyde in 300 ml. of ethanol is added. After 2 hours the solution is filtered and concentrated under reduced pressure to an oily residue. Addition of 500 ml. of hot isopropyl alcohol induces crystallization; 74 g. of crude 3-(2-diisopropylaminoethyl)-1-(5-nitrofurfurylideneamino)hydantoin hydrochloride is obtained. Recrystallization from 2.5 l. of 90% ethanol using charcoal, followed by recrystallization from methanol, yields 44 g., M.P. 230–240° C. dec.

EXAMPLE VII

*3-(3-Isopropylaminopropyl)-1-(5-Nitrofurfurylideneamino)hydantoin Hydrochloride*

A mixture of 55 g. (0.27 mole) of benzylideneaminohydantoin, 12 g. (0.27 mole) of a 54% dispersion of sodium hydride in mineral oil and 1 liter of dimethylformamide is heated on the steam bath until reaction is complete. Then 37 g. (0.27 mole) of 3-isopropylaminopropyl chloride is added and the mixture is heated at 115–125° C. for 17 hours. The precipitated sodium chloride is filtered and the filtrate is concentrated under reduced pressure to ca. 200 ml. Water is added and the mixture is cooled in ice. The crystals which separate are filtered, washed with water and dissolved in 1 liter of water containing 30 ml. of hydrochloric acid. This solution is steam distilled until evolution of benzaldehyde ceases. A solution of 30 g. of 5-nitro-2-furaldehyde in ethanol is added and the solution is cooled in ice. The yellow crystalline solid is collected, washed with isopropyl alcohol and air-dried; 14.5 g. of crude product is obtained. This is recrystallized from water-isopropyl alcohol to yield 11 g. of 3-(3-isopropylaminopropyl)-1-(5-nitrofurfurylideneamino)hydantoin hydrochloride, M.P. 247–248° C. dec.

EXAMPLE VIII

*3-(3-Diisopropylaminopropyl)-1-(5-Nitrofurfurylideneamino)hydantoin Hydrochloride*

88.5 g. (0.43 mole) of 1-benzylideneaminohydantoin dissolved in 2 liters of dimethylformamide, 18.9 g. of 55% sodium hydride in mineral oil, 76 g. of 3-diisopropylaminopropyl chloride, and 60.63 g. of 5-nitro-2-furaldehyde are reacted according to the procedure in Example I. After adding the 5-nitro-2-furaldehyde and concentrating under vacuum yellow crystals are formed which are filtered and washed with ethanol and dry ether; M.P. 138–141° C., weight=116.72 g. (71% yield). These are recrystallized from an ethanol-water solution (ca. 10:1) to yield 3 - (3-diisopropylaminopropyl)-1-(5-nitrofurfurylideneamino)-hydantoin hydrochloride; M.P. 224–227° C., weight=63.8 g. (39% yield).

EXAMPLE IX

*3 - (4-Dimethylaminobutyl)-1-(5-Nitrofurfurylideneamino)hydantoin Hydrochloride and; 1-Benzylidene-3-(4-Iodobutyl)hydantoin Hydrochloride*

42.3 g. (0.144 mole) of 1-benzylidene-3-(4-chlorobutyl)hydantoin is dissolved in approximately 4 liters of acetone in the cold and then 105 g. (0.7 mole) of sodium iodide in acetone is added. The resulting solution is refluxed for two hours. The salt (sodium chloride) formed is filtered and dried, weight=7.12 g. (yield 83%), and the filtrate is poured into water. A white solid precipitates out immediately. This is filtered and washed well with water (weight=40 g.; yield 72.3%). After drying the M.P. is 138–140° C.

*1-Benzylideneamino-3-(4-Dimethylaminobutyl)hydantoin*

38.5 (0.1 mole) of 1-benzylidene-3-(4-iodobutyl)hydantoin is dissolved in 3500 ml. of ethanol by heating. When solution is complete, a total of 6 equivalents of dimethylamine in ethanol are added in three portions: Three equivalents (195 ml. ethanol containing 13.5 g.) at the outset; 1½ equivalents (100 ml. ethanol containing 6.75 g.) at the end of three hours' refluxing; another 1½ equivalent after two more hours' refluxing. The reaction mixture is refluxed for 24 hours. After overnight standing at room temperature, the reaction mixture is filtered and the filtrate evaporated to dryness on a steam bath under reduced pressure. The white residue is triturated with water, heated and filtered while still hot. The aqueous solution is made alkaline with concentrated ammonium hydroxide. A white solid precipitates out immediately. After cooling in an ice bath for about ½ hour, it is filtered, washed well with water and dried. Further drying at 60° C. gives 23.0 g. (76.2%).

*3-(4-Dimethylaminobutyl)-1-(5-Nitrofurfurylideneamino)hydantoin Hydrochloride*

23.0 g. of the above free amine is steam distilled in the presence of concentrated hydrochloric acid until no benzaldehyde odor can be detected. The mixture is concentrated by distillation at reduced pressure. To the concentrate is added 10.72 g. (0.76 mole) of 5-nitro-2-furaldehyde in ethanol. A yellow solid precipitates upon cooling. It is washed with ethanol and ether. It is recrystallized from ethanol-water mixture to give 18.0 g. of 3 - (4-dimethylaminobutyl)-1-(5-nitrofurfurylideneamino)hydantoin hydrochloride. An analytical sample gives a melting point of 233–235° C. with decomposition.

What I claim is:

1. The compounds having chemotherapeutic activity and resistance to metabolic destruction of the formula

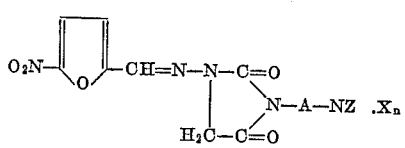

in which

A represents an alkylene chain containing from 2 to 4, inclusive, carbon atoms;

NZ represents a member of the group consisting of monoalkylamino, dialkylamino and piperidino;

X represents a pharmaceutically acceptable mineral acid; and n represents a number from 0–1.

2. 3 - (3 - dimethylaminopropyl) - 1 - (5-nitrofurfurylideneamino)hydantoin hydrochloride represented by the formula:

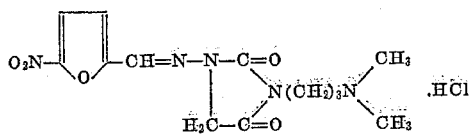

3. 3 - (4 - piperidinobutyl) - 1 - (5 - nitrofurfurylideneamino)hydantoin hydrochloride represented by the formula:

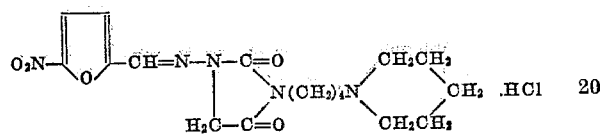

4. 3 - (3 - isopropylaminopropyl) - 1 - (5-nitrofurfurylideneamino) hydantoin hydrochloride represented by the formula:

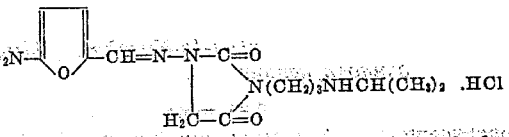

5. 3 - (3 - diethylaminopropyl) - 1 - (5 - nitrofurfurylideneamino) hydantoin hydrochloride represented by the formula:

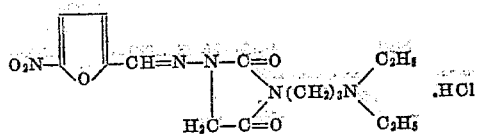

References Cited in the file of this patent
UNITED STATES PATENTS

| | | |
|---|---|---|
| 2,610,181 | Hayes | Sept. 9, 1952 |
| 2,802,002 | Gever | Aug. 6, 1957 |
| 2,927,110 | Gever et al. | Mar. 1, 1960 |
| 2,990,402 | Jack et al. | June 27, 1961 |